Patented Nov. 26, 1940

2,223,086

UNITED STATES PATENT OFFICE 2,223,086

BINDER FOR FIBROUS MATERIALS

Robert C. Williams and James F. Hall, Columbus, Ohio, assignors to The Ironsides Company, Columbus, Ohio, a corporation of Ohio No Drawing. Application February 24, 1937, Serial No. 127,572

4 Claims. (Cl. 260—27)

This invention relates to a novel film-forming composition having certain improved properties by which the same is rendered particularly useful as a binder in the fabrication of fibrous mineral wool insulation. An object of the invention resides in the provision of an improved binder wherein the individual fibers comprising a body or "bat" of mineral wool insulation are positively yet resiliently united to preserve the desired form and shape of the bat, as well as to permit of its ready handling without loss of shape, thereby reducing losses and structural impairment incident to storage, transportation and installation operations.

Certain of the commercially used binders or adhesive compositions now used on insulating wools are characterized by the tendency thereof to become so brittle that normal handling of the wool in the form of bats results in the fracture of the union between adjoining fibers and the binder, destroying or reducing the resiliency of the bat and rendering the same, in proportion to the degree of fracture, less efficient as an insulating medium. Other binders are so adhesive or tacky in nature that when the bats of mineral wool treated therewith are compressed during packaging, the fibers tend to become matted together in such close compact order that the desired resiliency of the bat is often destroyed. Furthermore, the use of such heavy viscous binders increases the density of the bat and correspondingly minimizes its thermal insulating value.

Other binders act as lubricants on the wool fibers causing the fibers to soften so that their normal rigidity or stiffness is reduced or lost, thereby rendering handling and installation more difficult, due to the tendency of the bat to disintegrate. Conventional binding materials, such as starch solutions, sodium silicate solutions and the like are not water resistant, and consequently bats of wool treated with such solutions and exposed to the weather readily tend to disintegrate and absorb moisture.

In accordance with the present invention, we have produced an improved binder or adhesive composition for wool fiber wherein the objectionable properties above noted, among others, present in many of the commercially used binders, are eliminated or reduced and a product provided which generally improves the structural characteristics of mineral wool when the latter is prepared for practical use as thermal insulation.

Our improved composition is composed of petroleum polymers of the type obtained from the treatment of vapor phase cracked gasolines in the removal of gum-forming bodies therefrom, rosin such as wood or gum rosin and resinates such as calcium or zinc resinate. The composition composed of these ingredients may be applied as a solution, in which case it may be dissolved in the petroleum or aromatic solvent, or it may be emulsified in water with the latter in the continuous phase.

Hydrocarbon polymers of the type useful in the manufacture of my improved composition are of the type usually obtained from unsaturated hydrocarbon compounds produced as residues from gasolines or motor fuels obtained from high temperature operations. For example, in such operations, it is customary to pass gas-oil fractions in a vaporous state through a heated conversion zone wherein the vaporized hydrocarbons are subjected to conversion temperatures ranging between 1000° F. and 1250° F. and are afterwards fractionated, condensed and collected to obtain a condensate having the boiling range of gasoline, which condensate is composed largely of unsaturated compounds.

Certain of these compounds, notably the di-olefines, are highly reactive and readily combine with oxygen to produce higher boiling compounds known generally by the terms "gums" or "polymers." To remove these gums or polymers and to accelerate their formation to such condensate, the cracked hydrocarbons are preferably passed in a vaporized condition into contact with catalytic or absorptive materials such as fuller's earth, bentonite, infusorial earths and other analogous substances. These substances apparently exercise a catalytic action on the more reactive unsaturated compounds and produce polymerizing reactions whereby these polymerized compounds, termed "polymers," may be removed through difference in specific gravity from the lower boiling fractions comprising the desired motor fuel condensate or distillate. These gums or polymers, produced by passing vaporized unsaturated hydrocarbons of gasoline boiling range through fuller's earth, possess a higher boiling range than the original condensate or distillate from which they were formed, thus indicating the polymerization promoting character of the catalytic or absorptive materials used in accelerating their formation. The removal of these gums or polymers from the gasoline distillate renders the latter suitable for various commercial uses.

Treating operations for cracked motor fuel distillate of the character set forth result in the formation of considerable quantities of these gums or polymers. We have discovered that these polymers which are reactive unsaturated hydrocarbons and readily unite with oxygen, may be advantageously used in connection with the manufacture of our improved mineral wool binder for the purpose of improving the properties of the mineral wools upon which binders or adhesive compounds are employed.

These polymers resulting from the polymerization of unrefined vapor phase cracked gasoline in the manner previously set forth will have substantially the following properties:

|  | Liquid | Liquid | Solid |
|---|---|---|---|
| Gravity | 15.5–18.5 | 10–11 A. P. I. | Sp. grav. 1.023–1.029. |
| Flash | 175 min | 230° F. min | Melting pt.—170/190° F. |
| Fire | 215 min | 280° F. min |  |
| Viscosity | 200–225 @ 100° F. | 225–300 @ 210° F. |  |
| Pour | 0° F. max | 45° approx. |  |
| Iodine No | 195 min | 200 min | 200 min. |
| Molecular wgt. | 300 approx. | 425 approx. | 700 approx. |
| Percent solids | 60–65 | 80–85 | 100. |
|  | Miscible in all proportions with petroleum solvents. |  | Soluble in coal tar solvents. |

As illustrative of the invention and without limiting the scope thereof, the following examples are given disclosing the use of reduced hydrocarbon polymers of the character above set forth, in mineral wool adhesives or binders. By the expression, "reduced hydrocarbon polymers," it will be understood that we refer to polymers obtained substantially by the process above outlined and heated or filtered to liberate therefrom low-boiling constituents, leaving as polymers a thick viscous resinous material of high boiling range.

EXAMPLE 1.—*Solvent types*

|  | Parts |
|---|---|
| Wood or gum rosin | 25 |
| Hydrated lime | 3 |
| Reduced polymers | 30 |
| Naphtha or other petroleum solvent | 42 |

In mixing these materials, the rosin is gradually heated to a temperature of approximately 500° F., the hydrated lime being sifted into the same during the heating thereof. The heating operation is then discontinued and the rosin allowed to cool to a temperature of the order of 200° F., at which time the hydrocarbon polymers and naphtha are added.

EXAMPLE 2

|  | Parts |
|---|---|
| Rosin | 15 |
| Polymers | 18 |
| Liquid asphalt | 34 |
| Solvent | 33 |

EXAMPLE 3

|  | Parts |
|---|---|
| Rosin | 47 |
| Lime | 3 |
| Polymers | 15 |
| Asphalt | 20 |
| Solvent | 15 |

When lime is omitted, as in Example 2, the resin needs merely to be heated to a melting temperature. The preparations as defined may also be reduced to an emulsified state if desired. As typical of our improved preparation in an emulsified form, the following example is given.

EXAMPLE 4.—*Emulsion type*

|  | Parts |
|---|---|
| Wood or gum rosin | 20 |
| Polymers | 20 |
| Stearic acid | 3 |
| Aqua ammonia (commercial concentration 26° Bé.) | 4 |
| Water | 53 |

In the above, the rosin and stearic acid content are heated together, and the mixture cooled to approximately 200° F., at which time there is introduced into the heated materials, the water, polymers and ammonia. In the above examples, abietic acid may be substituted for the wood or gum rosin and/or stearic acid, and in lieu of ammonia, other volatilizable alkaline agents may be employed, such as methylamine or ethylamine. Any suitable method may be used for applying the composition to the fibers of mineral wool, usually by means of spraying operations. After application of the binder and upon evaporation of the solvent or water content thereof, the resulting film deposited on the fibers or other particles becomes progressively harder as the drying of the polymers proceeds. In addition to its use in connection with siliceous wools, our improved binding composition may also be employed on such materials as granulated cork, cellulose plant fibers, and also slag fibers.

The composition air dries quite rapidly, since reduced hydrocarbon polymers have a more rapid drying rate than linseed oil. The low boiling liquid in which the resinate-polymer mixture is embodied at time of application to the fibers, evaporates first, leaving the said resinate-polymer mixture as an adhesive coating on the fibers so that the latter may be readily shaped, pressed or packaged into a body or bat of predetermined formation. However, the nature of this residual adhesive coating is such that the wool fiber treated therewith does not reach a brittle state of hardness, in order that the desired resiliency of the bat will be retained permanently.

Where the emulsion type is desired for certain applications, the film-forming ingredients may be emulsified in water, as indicated in Example 4. Where the film-forming ingredients melt at high temperatures, minor proportions of solvent may be required with the solid unreactive (with ammonia) ingredients to facilitate emulsification.

What is claimed is:

1. An air-drying adhesive composition for binding mineral wool comprising per hundred parts of the total composition from 15 to 30 parts of hydrocarbon polymers of mineral origin resulting from the polymerization of unrefined vapor-phase cracked gasoline, from 15 to 47 parts of a rosin component, and a removable solvent.

2. An air-drying adhesive composition for binding mineral wool comprising per hundred parts of the total composition from 15 to 30 parts of hydrocarbon polymers of mineral origin resulting from the polymerization of unrefined vapor phase cracked gasoline, from 15 to 47 parts of a rosin component, a substantial amount of liquid asphalt, and a removable hydrocarbon solvent.

3. An air-drying adhesive composition for binding mineral wool comprising per hundred parts of the total composition from 15 to 30 parts of hydrocarbon polymers of mineral origin resulting from the polymerization of unrefined vapor phase cracked gasoline, from 15 to 47 parts of rosin fluxed with lime, and a removable hydrocarbon solvent.

4. An air-drying adhesive composition for binding mineral wool comprising per hundred parts of the total composition from 15 to 30 parts of hydrocarbon polymers of mineral origin resulting from the polymerization of unrefined vapor phase cracked gasoline, from 15 to 47 parts of rosin fluxed with a higher fatty acid, a volatile alkaline agent, and a removable aqueous solvent.

ROBERT C. WILLIAMS.
JAMES F. HALL.